United States Patent
Amann

[11] 3,785,145
[45] Jan. 15, 1974

[54] GAS TURBINE POWER PLANT
[75] Inventor: Charles A. Amann, Bloomfield Hills, Mich.
[73] Assignee: General Motors Corporation, Detroit, Mich.
[22] Filed: Nov. 10, 1971
[21] Appl. No.: 197,300

[52] U.S. Cl. ............... 60/39.24, 60/39.51, 60/39.52
[51] Int. Cl. ........................... F02c 7/10, F02c 9/02
[58] Field of Search ........................ 60/39.24, 39.29, 60/39.51, 39.52, 39.16, 39.03, 39.09

[56] References Cited
UNITED STATES PATENTS

| | | | |
|---|---|---|---|
| 2,718,754 | 9/1955 | Lewis | 60/39.52 UX |
| 2,758,979 | 8/1956 | Guthrie | 60/39.52 UX |
| 3,520,133 | 7/1970 | Loft | 60/39.28 T |
| 2,303,381 | 12/1942 | New | 60/39.52 X |
| 2,608,822 | 9/1952 | Pavlecka | 60/39.52 UX |
| 2,624,172 | 1/1953 | Houdry | 60/39.52 X |
| 3,418,806 | 12/1968 | Wagner | 60/39.51 R |
| 3,541,790 | 11/1970 | Kellett | 60/39.52 |
| 3,597,920 | 8/1971 | Wadman | 60/39.52 |

*Primary Examiner*—Clarence R. Gordon
*Attorney*—Paul Fitzpatrick et al.

[57] ABSTRACT

A regenerative fuel-fired gas turbine power plant includes ducting and a valve to direct some of the engine exhaust into the engine inlet where it mixes with air flowing into the compressor of the engine. This recirculation of exhaust gases is controlled so that it takes place substantially only during the warm-up period of the engine after it is started and brought up to idling speed, and until the regenerator has been brought to something like normal operating temperature. Recirculation volume is controlled by a temperature in the engine.

6 Claims, 2 Drawing Figures

PATENTED JAN 15 1974

3,785,145

INVENTOR.
Charles A. Amann
BY
Paul Fitzpatrick
ATTORNEY

GAS TURBINE POWER PLANT

My invention is directed to gas turbine engines and particularly to means to recirculate a portion of the exhaust gases of a fuel-burning regenerative gas turbine to the engine inlet during the warm-up period after starting the engine.

Experience with reciprocating internal combustion engines has demonstrated that they have a tendency to relatively high output of substances regarded as atmospheric pollutants during the period after starting the engine before it is thoroughly warmed up. There is reason to believe that the same sort of problem exists with regenerative gas turbines. It will be appreciated that when the engine is started, the parts of the engine are cold; particularly, the usual gas turbine regenerator which contains a substantial amount of metal will be cold and will require some time to be heated to normal operating temperature.

By exhaust gas recirculation, a higher combustion temperature and higher temperature of gas flowing to the regenerator can be maintained with the relatively low fuel flow attendant upon idling operation of the engine during warm-up, so as to warm up the regenerator more quickly.

To implement the invention, suitable controls are provided to limit the exhaust recirculation so as to prevent over-temperature in the engine and to terminate the recirculation after a desired time interval or upon initiation of normal power developing operation of the gas turbine engine.

The principal objects of the invention are to improve the emission characteristics of gas turbine engines after starting and to provide a method and means for more rapid warm-up of a regenerative gas turbine engine after starting.

I realize that exhaust gas recirculation in a gas turbine engine has been suggested hitherto but, so far as I am aware, not under the conditions and with the mode of control to which my invention is directed. For example, Whitelaw U.S. Pat. No. 3,252,286, May 24, 1966, shows an indirectly heated gas turbine power plant in which the turbine exhaust (which is clean air in this case) is recirculated to the compressor under a control which is employed to reduce the power plant output more rapidly than the heat input from a nuclear heat source can be reduced. Kellett U.S. Pat. No. 3,541,790, Nov. 24, 1970, illustrates a proposed gas turbine in which air and air carbureted with fuel are supplied by separate compressors to a combustion apparatus. Some of the turbine exhaust is recirculated through a valve to mix with the carbureted air, as the patentee states, to limit the combustion temperature because of the lower oxygen content of the exhaust gases than of pure air. Also, of course, there are many patent disclosures of semi-closed-circuit gas turbine plants.

The nature of my invention and its advantages will be clear to those skilled in the art from the succeeding detailed description of the preferred embodiment of the invention and the accompanying drawings thereof.

Figure 1:
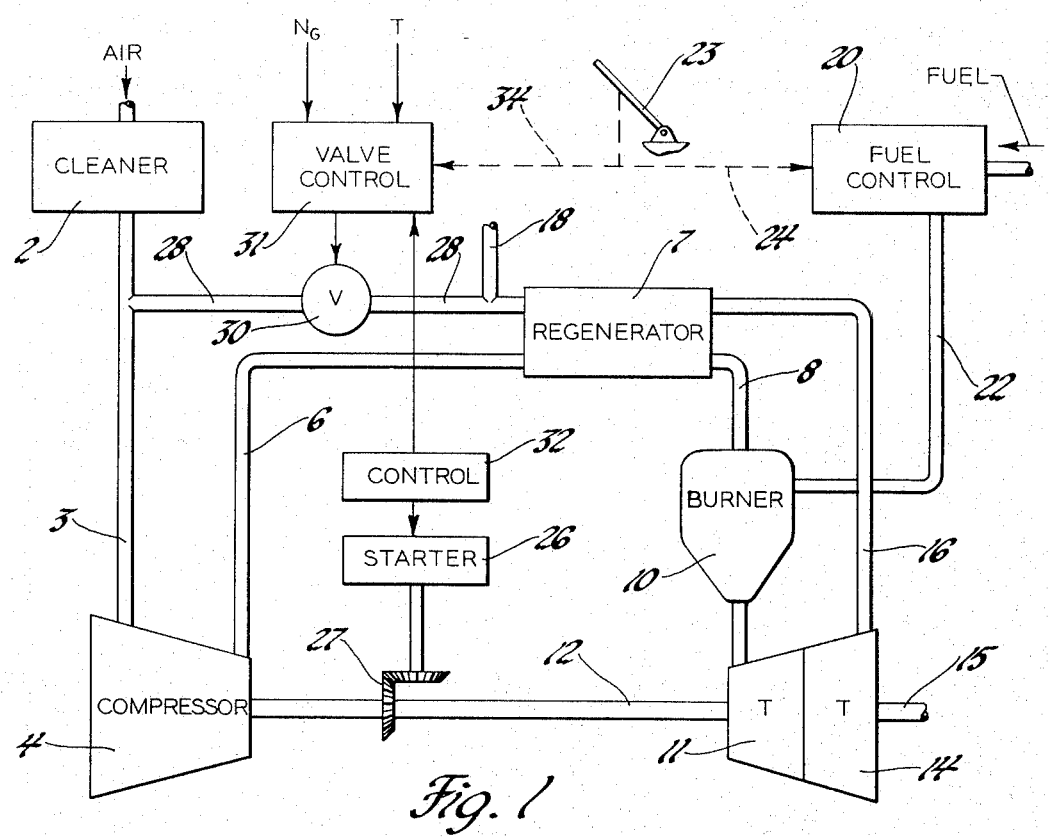
FIG. 1 is a schematic diagram of a gas turbine power plant.

As illustrated in FIG. 1, the power plant includes an optional air cleaner 2 through which atmospheric air enters and flows through ducting 3 into the inlet of a compressor 4. The compressor discharges through ducting 6 and through the compressed air pass of a regenerator 7. The regenerator may be of the rotary type or be a fixed recuperator, in which the two media between which heat is exchanged flow through separate passages. The compressed air heated in the regenerator flows through duct 8 into a combustion apparatus or burner 10 which discharges into a gas generator turbine 11. This turbine drives the compressor through a shaft 12; the compressor 4, burner 10, and turbine 11 being termed a gas generator since their function is to supply motive fluid to a power output turbine 14 which drives the shaft 15. The exhaust from turbine 14 flows through ducting 16 and through the hot gas pass of the regenerator 7 and normally to an exhaust outlet 18. Shaft 15 may power any driven device.

Fuel from any suitable source is supplied through a fuel control 20 and a metered fuel line 22 to the burner 10. The fuel control receives an engine power delivery demand input from a suitable driver-operated control such as the foot throttle pedal 23, coupled to the fuel control by linkage indicated by the broken line 24. The fuel control may be of any normal suitable type; such fuel controls ordinarily include means responsive to the speeds of the turbines and to temperature at some point of the engine to meter fuel under control of the input device 23 to cause the engine to run safely at the desired power level, to provide good acceleration characteristics for the engine, and to maintain combustion. There is no need to discuss such controls in detail here.

The engine includes a starter 26 connected by gearing 27 to the gas generator shaft 12. The power plant as so far described will be recognized as of a type widely known. It will be obvious that elements may be connected directly for flow rather than through some of the schematically indicated ducting on FIG. 1.

Figure 2:
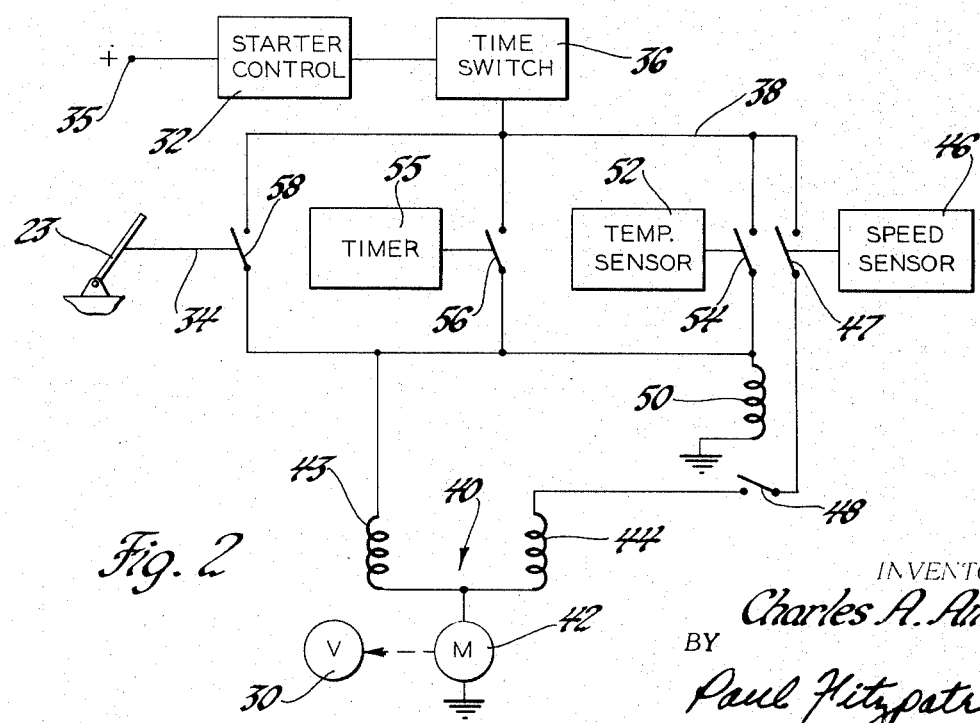
FIG. 2 is a schematic diagram of a recirculation valve control system.

My invention relates to the provision in such a power plant, or other power plants having characteristics which make them adaptable to it, of a contr9l for recirculating exhaust gas into the engine inlet during warm-up. Considering this in relation to FIG. 1, a recirculation duct 28 runs from the exhaust 18 downstream of regenerator 7 into the compressor inlet 3 downstream of inlet air cleaner 2, if one is provided. While the recirculating gas could enter ahead of the air cleaner, this is not considered desirable. Flow through the recirculation duct 28 is controlled by a valve 30 which, as illustrated, is of a throttling type opened and closed by an electric motor 40 (FIG. 2). The electric motor is controlled by a valve control device 31 which, as indicated on the schematic, receives an input of $N_G$, gas generator speed, and an input of temperature in the engine indicated by T. This temperature may be taken at any point in the engine which can accurately reflect the tolerance of the engine for the recirculated exhaust gases. The input of temperature to the valve control may come from a suitable temperature sensor in the compressor inlet duct 3, the compressor outlet duct 6, the gas generator turbine inlet duct downstream of the burner 10, or the power turbine exhaust duct 16.

The valve control 31 also receives an input from a starter control device 32 which may be an electric current indicative of energization or deenergization of the starter.

There is also preferably an input to the valve control from the foot throttle 23, as indicated by the dotted line 34 representing a suitable connection. This input may be a mechanical connection to a switch or may be a switch operated directly by the foot throttle and connected into circuits in the valve control.

FIG. 2 illustrates one arrangement of a control system for the valve 30. In FIG. 2, the starter control 32 of FIG. 1 energizes an electrical control system from a source 35. This may be effected by a switch in the starter control which is closed upon energization or upon subsequent deenergization of the starter. Preferably, the valve control is energized for a limited time sufficient to outlast the warm-up time of the engine and is then cut off to stop current drain by the system. This function may be satisfied by a time switch 36 which maintains current flow from the source 35 to the control system for a definite time. The starter control and time switch energize a bus 38 for operation of motor 40, which may be of the type having separate field windings, one for operation of the motor in each direction, and an armature 42 connected mechanically to the valve 30. The motor includes field coil 43 energized to close the valve and field coil 44 energized to open the valve.

In the circuit illustrated, the valve remains closed upon initiation of the engine start and acceleration to idle speed. The attainment of idle speed by the gas generator is determined by speed sensor 46 which receives the gas generator speed input previously referred to. This speed sensor controls a switch 47 energized from bus 38 which is connected through back contacts 48 of a relay 50 to the valve opening field coil 44. Normally, the relay is deenergized when switch 48 is closed; thus, upon attainment of idle speed, the field coil 44 and armature 42 are energized and the motor opens valve 30 to recirculate combustion products. The maximum quantity of combustion products recirculated will be determined by the ducting; normally there is a slight pressure drop between the exhaust and the compressor inlet, and the exhaust is at least at atmospheric pressure, so that the gas may be drawn into the compressor inlet along with the fresh air.

The relay 50 serves to disable the valve opening circuit whenever a valve closing signal is transmitted to the valve closing field 43. This signal may come from any one of several sources, as illustrated. One is a temperature sensor 52 which receives the input of temperature in the engine as described above. The sensor acts to close a switch 54 whenever the temperature reaches the desired maximum for that particular station in the engine under recirculating conditions. When switch 54 closes, the valve opening circuit is disabled and the valve closing circuit is completed so that the motor drives to close the valve. Preferably, this closing action takes place somewhat gradually so that the flow of recirculating air may be maintained at or near a value at which maximum desirable temperature is maintained by hunting action of motor 40. Thus, sensor 52 serves as a regulating means to control the quantity of exhaust products recirculated. On the other hand, it is possible to have the system such that, upon the attainment of the over-temperature, the valve is driven all the way closed.

The system may include a timer 55 operating a switch 56, also capable of energizing the valve closing motor from the bus 38. Obviously, the switch 56 might be operated by the time switch 36 rather than by a separate timer. The timer 55 is intended to close the recirculation valve after a time which is sufficient for heating up the regenerator. Obviously, it is possible to dispense with the timer, but its presence is an additional safety factor. The timer 55, if present, should close switch 56 before the deenergization of the bus 38 so that the valve 30 will be closed.

Another desired control is provided by the power demand switch 58 operated by the foot throttle control pedal 23 through the linkage 34. This switch is effective to energize the valve closing field 43 whenever the foot pedal is actuated to call for acceleration of the gas generator above idle, for power output purposes. This is desirable because, whether or not full heating of the regenerator has occurred, recirculation of the warm exhaust gas is inimical to acceleration of the gas generator.

It will be clear to those skilled in the art that many arrangements of controls may be devised to achieve the desired objectives of control of recirculation as described above in this specification.

The operation of the system should be clear from the foregoing but may be reviewed briefly. Assuming that the engine is being started, it is cranked by the starter and at some speed fuel is introduced and ignited and the engine accelerates to idle speed, the starter presumably cutting out at some point below engine idle. The engine will remain in idling operation unless the foot control 23 is depressed.

Upon energization of the starter or deenergization of the starter, the time switch 36 is closed to energize the valve control system and, if speed is up to idle or when it reached idle, the speed sensor will close switch 47 to operate the motor to open the recirculating valve 30. This will occur unless the opening circuit is disabled by the foot throttle, the timer, or the temperature sensor. The valve closing circuit is made effective upon occurrence of a temperature above the desired value in the engine, upon expiration of a predetermined time, or upon operation of the foot throttle to accelerate the engine for movement of the vehicle or assumption of any other load. The temperature control 55 may also act to modulate recirculation flow by action of switch 55 and relay 50. To prevent continued drain through the control, the time switch cuts off the entire system a resonable time after it is energized. It will be clear that the recirculating cycle can be initiated by various signals, such as one responsive to energization of the igniter or to initiation of fuel flow.

It will be seen that this arrangement provides a suitable controlled and safeguarded arrangement for recirculating exhaust products into the inlet of the engine and controlling the quantity of such products so as to avoid interference with proper operation of the engine such as over-temperature, tendency to surge, or interference with desired acceleration capability.

So far as the fuel control 20 of the engine is concerned, the recirculation amounts to increasing the temperature of the air entering the compressor, with which the fuel control is able to cope. Since such an engine runs very lean at idle, no great variation in the proportion of oxygen available in the air being supplied to the burner 10 is caused by the recirculation.

The detailed description of the preferred embodiment of the invention for the purpose of explaining the principles thereof is not to be considered as limiting or restricting the invention, since many modifications may be made by the exercise of skill in the art.

I claim:

1. A gas turbine power plant comprising air compressor means, combustion apparatus supplied by the compressor means, turbine means energized by the combustion apparatus and connected to drive the compressor means, and a regenerator for heating the air flowing from the compressor means by the turbine exhaust, characterized by conduit means for recirculating turbine exhaust gas from downstream of the regenerator into the inlet of the compressor means, a valve in the conduit means, and means effective to open the valve after starting the power plant and to close the valve after warm-up of the heat exchange means has occurred.

2. A gas turbine power plant comprising air compressor means, combustion apparatus supplied by the compressor means, turbine means energized by the combustion apparatus and connected to drive the compressor means, and a regenerator for heating the air flowing from the compressor means by the turbine exhaust, characterized by conduit means for recirculating turbine exhaust gas from downstream of the regenerator into the inlet of the compressor means, a valve in the conduit means, means effective to open the valve after starting the power plant, means effective to control the valve opening in response to a temperature in the power plant, and means effective to close the valve after warm-up of the heat exchange means has occurred.

3. A gas turbine power plant comprising air compressor means, combustion apparatus by the compressor means, turbine means energized by the combustion apparatus and connected to drive the compressor means, and a regenerator for heating the air flowing from the compressor means by the turbine exhaust, characterized by conduit means for recirculating turbine exhaust gas from downstream of the regenerator into the inlet of the compressor means, a valve in the conduit means, means effective to open the valve when the power plant reaches idling speed after starting, means effective to control the valve opening in response to a temperature in the power plant, and means effective to close the valve upon acceleration of the power plant from idling speed.

4. A regenerative fuel-burning gas turbine engine including means to mix cooled turbine exhaust gas with air entering the engine during warm-up of the regenerator of the engine after starting, the mixing means including valve means for controlling exhaust gas flow into the engine and control means for the valve including means effective to open the valve when the engine starting cycle is completed, means responsive to a temperature in the engine effective to control the valve opening, and means effective to close the valve after an engine warm-up period, the two last-recited means each being effective to override the valve-opening means.

5. A regenerative fuel-burning gas turbine engine including means to mix cooled turbine exhaust gas with air entering the engine during warm-up of the regenerator of the engine after starting, the mixing means including valve means for controlling exhaust gas flow into the engine and control means for the valve including means effective to open the valve when the engine starting cycle is completed, means responsive to a temperature in the engine effective to control the velve opening, and means effective to close the valve upon acceleration of the engine from an idle operating condition, the two last-recited means each being effective to override the valve-opening means.

6. A regenerative fuel-burning gas turbine engine having a starter and including means to mix cooled turbine exhaust gas with air entering the engine during warm-up of the regenerator of the engine after starting, the mixing means including valve means for controlling exhaust gas flow into the engine and control means for the valve means including means responsive to engine speed effective to open the valve after a predetermined engine speed is reached, means responsive to a temperature in the engine effective to move the valve in a closing direction in response to a predetermined temperature, timing means effective to close the valve a predetermined interval after starting, and engine power demand responsive means effective to close the valve upon demand for engine acceleration, the three last-recited means each being effective to override the valve-opening means.

* * * * *